Dec. 28, 1937.  E. F. SPINNER  2,103,959
CLUTCH FOR TRANSMISSION GEARING
Filed Oct. 21, 1935  3 Sheets-Sheet 1
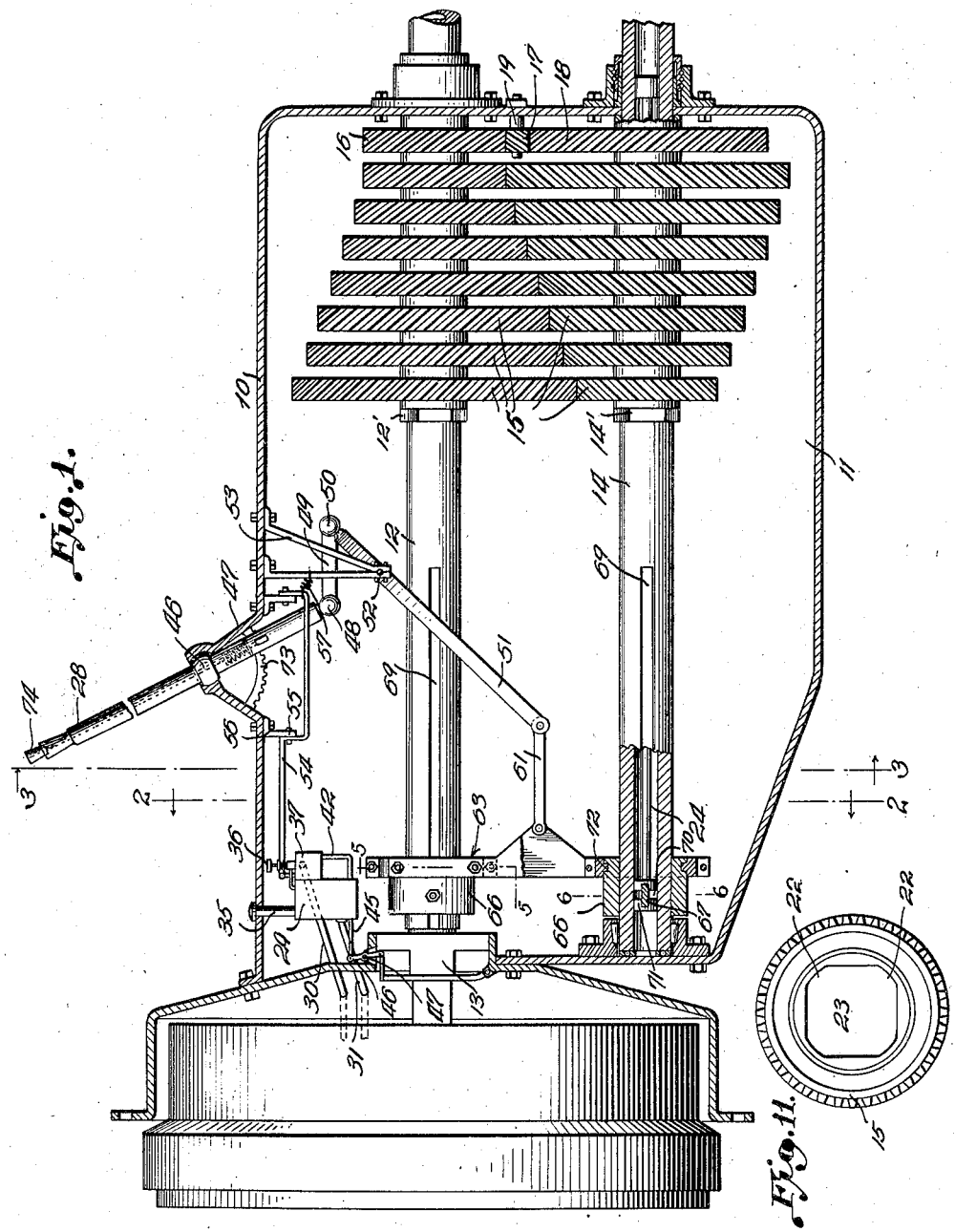

Dec. 28, 1937.   E. F. SPINNER   2,103,959
CLUTCH FOR TRANSMISSION GEARING
Filed Oct. 21, 1935   3 Sheets-Sheet 2
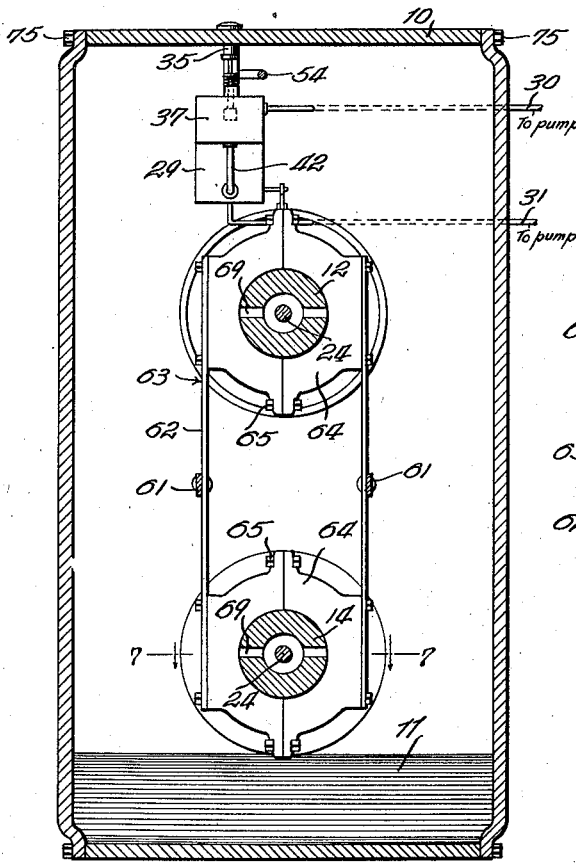
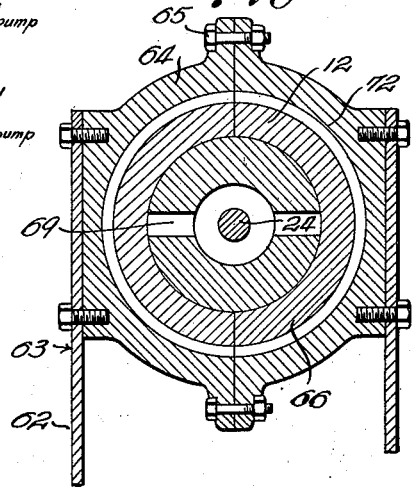
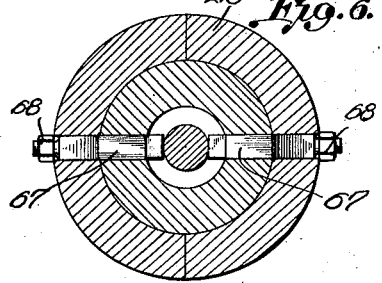
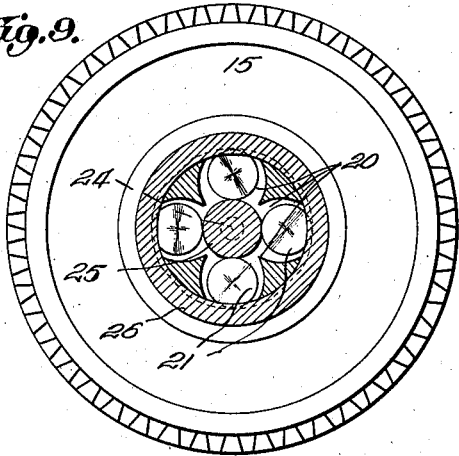
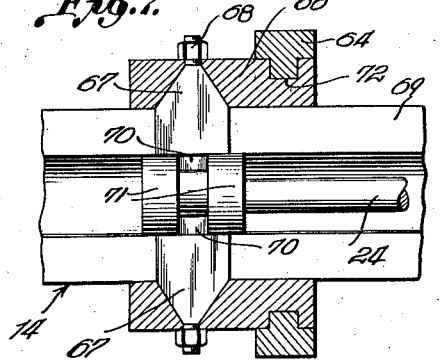
Inventor:
Edson Fitch Spinner Dec. 28, 1937. E. F. SPINNER 2,103,959
CLUTCH FOR TRANSMISSION GEARING
Filed Oct. 21, 1935 3 Sheets-Sheet 3
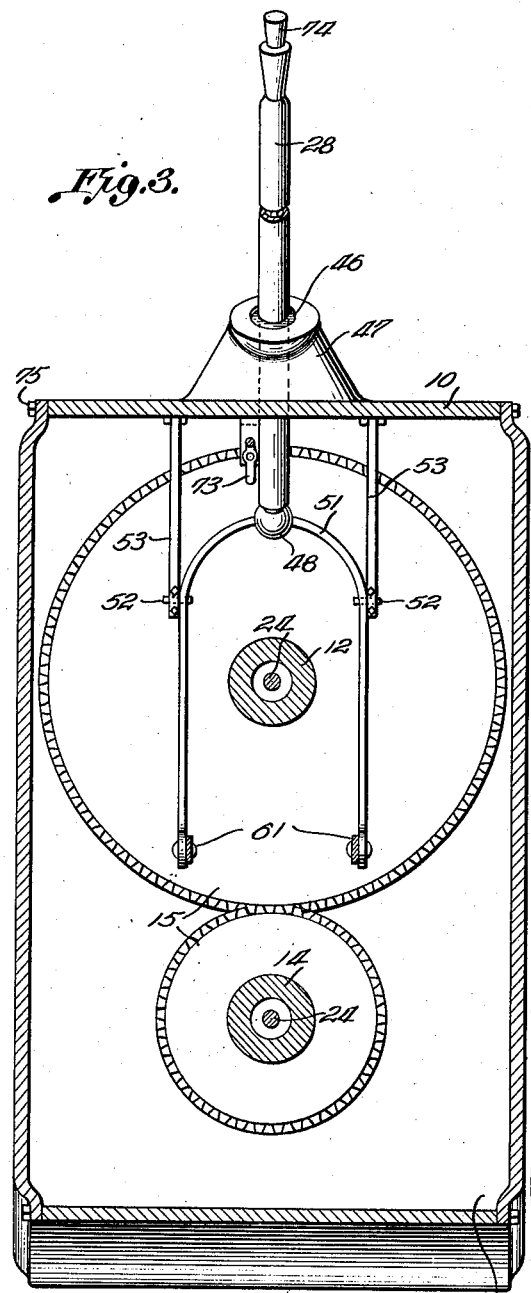
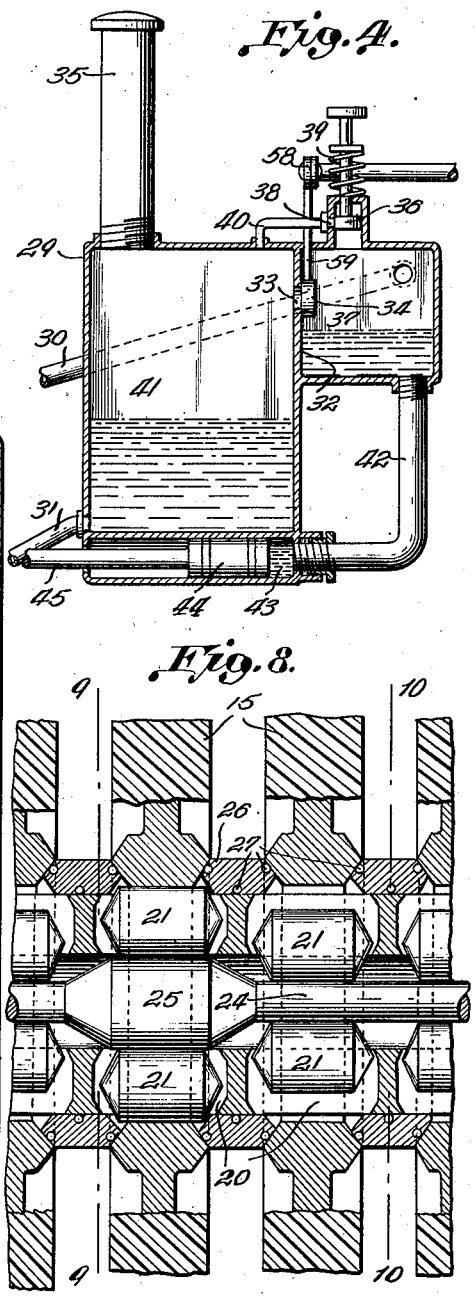
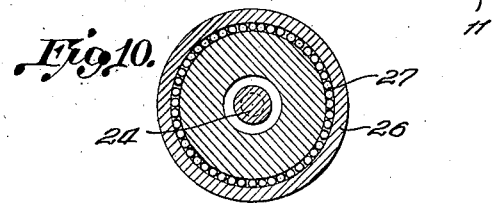
Inventor:
Edson Fitch Spinner Patented Dec. 28, 1937

2,103,959

UNITED STATES PATENT OFFICE 2,103,959

CLUTCH FOR TRANSMISSION GEARING

Edson Fitch Spinner, Ava, Ill.

Application October 21, 1935, Serial No. 45,997

3 Claims. (Cl. 192—71)

This invention relates to unit clutch mechanism especially for transmission gearing of the type adapted for use in self propelled vehicles.

It is aimed to provide a novel construction wherein rotatable members such as gears, preferably helical gears have three-bearing floating motion, are arranged in pairs, in which the gears are always enmeshed, and adapted to be selectively placed in driving relation, as many pairs of the gears being employed as desired, and the speed ratio progressively increasing from one pair to the next.

It is further aimed to provide a novel structure wherein the clutch will be automatically thrown into neutral position, through the initial movement of a lever which is operable to select the pair of gears for driving.

It is further aimed to provide a structure wherein there is smooth operation, without grabbing, a structure wherein springs or other objectional parts are avoided and a structure which may be readily built with any desired number of pairs of the gears, according to the speeds desired, merely by the addition of the gears and the lengthening of parts.

The more specific objects and advantages will become apparent from a consideration of the description following taken in connection with the accompanying drawings illustrating an operative embodiment.

In said drawings:—

Figure 1 is a view through the transmission substantially in central vertical section;

Figure 2 is a vertical sectional view taken on the plane of line 2—2 of Figure 1;

Figure 3 is a vertical sectional view taken on the plane of line 3—3 of Figure 1;

Figure 4 is an enlarged longitudinal sectional detail through the pressure tank which controls the main clutch;

Figure 5 is a detail section taken on the line 5—5 of Figure 1;

Figure 6 is a detail section taken on the line 6—6 of Figure 1;

Figure 7 is a fragmentary longitudinal sectional view taken on the line 7—7 of Figure 2;

Figure 8 is a fragmentary, enlarged, longitudinal sectional view taken through a plurality of the change speed gears and associated parts;

Figure 9 is a detail section taken on the line 9—9 of Figure 8;

Figure 10 is a detail section taken on the line 10—10 of Figure 8, and

Figure 11 is a side elevation of one of the change speed gears.

Referring specifically to the drawings, 10 designates a suitable transmission case whose bottom constitutes an oil reservoir as at 11. Journalled longitudinally of the transmission case 10 in any suitable manner is a drive shaft 12 having a clutch 13 controlling the driving thereof from an engine or prime mover. Journalled in the case 10 below and parallel to the drive shaft 12 is a driven shaft 14.

The change speed gears, are shown at 15 and are preferably of the worm or helical type, being employed in pairs always enmeshed and with the upper gear of each pair loosely journalled on shaft 12, with the remaining or lower gears loosely journalled on the shaft 14. In addition, reverse gears are employed at 16, 17 and 18, of the worm or helical type and always enmeshed. Said gear 16 is loosely journalled on shaft 12 while gear 18 is loosely journalled on shaft 14 and gear 17 is an intermediate gear or idler journalled on a stub shaft 19 secured to the casing 10.

In line with each of the change speed gears, shafts 12 and 14, as best shown in Figure 9, have a plurality of radial equidistantly spaced slots or openings 20 therethrough in each of which a roller or other clutch member 21 is loosely mounted so as normally to project partly into the bores of the respective shafts 12 and 14 and to be movable slightly beyond the periphery of the shafts 12 and 14, to engage enlarged portions 22 of the bore 23 of the change speed gears 15, 16 and 18, to thus clutch said gears to the shafts in order to drive the latter.

Longitudinally reciprocable in the bore of each of shafts 12 and 14 is a shifting rod 24 for the rollers or clutch members 21. Each rod 24 has an enlarged portion at 25, which spreads the rollers or clutch members 21 of one gear wheel at a time, into clutching engagement with the portions 22 of such gear, while the remaining clutch members 21 remain loose and cannot become displaced due to the presence of the rods 24 in the bores of the shafts 12 and 14. It is to be noted that rings 26 surround the shafts 12 and 14 between the gears and carry ball bearings at 27 which engage adjacent parts in order to minimize friction, the rings and gears being held in proper relation by double nuts 12' and 14' screwed to the respective shafts.

The operation of the clutch 13 is controlled through the lateral or sidewise motion of a lever 28 and through the medium of intermediate mechanism, the control rods 24 are adapted to be reciprocated through a forward and a backward movement of such lever.

In order to operate the clutch 13, a pressure tank structure is employed at 29 through which a liquid or fluid is circulated by the action of a pump or the like, for instance a pump of the eccentric type or one driven by gears. The liquid or fluid circulates through pipes 30 and 31, a wall or diaphragm 32 of the tank being in the path of circulation and having a port 33 therein which port is closed by a laterally movable valve 34, when the clutch is to be disengaged. Liquid to replenish the supply in the tank 29 may be passed through a filler tube 35. The tank 29 has a safety valve 36 in a chamber 37 thereof which is normally held in position closing an outlet port at 38, urged by an expansive spring 39. Port 38 through a by-pass pipe 40 communicates with the main chamber 41 of the pressure tank. Thus when the pressure is excessive in the chamber 37 it will slide the valve 36 against the tension of spring 39, away from the port 38 permitting the excess pressure to escape into the chamber 41. A pipe 42 leads from the chamber 37 to a cylinder 43 in which a piston 44 is operable to move a rod 45 pivoted to a lever 46, in turn pivoted at 47, and connected to the clutch 13 to operate it. Thus while the port 33 is normally open and clutch 13 is normally engaged, movement of the valve 34 closes the port 33 which subjects the piston 43 to the action of the pressure which moves it outwardly, swinging lever 46 and moving the clutch to open position.

The aforesaid closing of the port 33 is effected through the operation of the lever 28. Such lever has ball and socket connection or a universal joint at 46 with a raised portion 47 of the casing and at the lower end, lever 28 has ball and socket connection at 48 to a link 49 having ball and socket connection at 50 to a lever 51 pivoted at 52 to a bracket 53 suspended from the top wall of casing 10.

A rocker bar 54 is pivoted on horizontal axes at 55 to brackets 56 depending from the top wall of casing 10 and which rocker bar is held in a normal position by a contractile coil spring 57 connected thereto and to the bracket 53. Pivoted to one end of the rocker bar 54 at 58 is an arm 59 carrying the aforesaid valve 34. Arm 59 extends through a suitably closed and air tight opening in the top wall of the chamber 37. Rocker bar 54 is in the path of lateral movement of the lever 28, the spring 57 maintaining the rocker bar in contact with such lever. Since the bar 54 is in said path of the lever, it will be rocked as the lever 28 is moved laterally, accordingly moving the valve 34 into closing relation with the port 33 so that pressure will build up and through the medium of pipe 42, cylinder 43 and piston 44, disengage or open the clutch.

Reverting to the lever 51, which is pivotally connected to links 61 in turn pivoted to vertical bars 62 constituting parts of a shifting head 63, completed by sectional blocks 64 to which the bars 62 are fastened and the sections of which block 64 are secured together for instance by means of bolts 65. Shifter collars or the like 66 surround the shafts 12 and 14, rotate therewith but slide along the same due to the fastening of lugs 67 thereon as by means of bolts 68 and which lugs are entered in longitudinal slots 69 in said shafts 12 and 14 and slide in such slots. Such lugs 67 have studs 70 thereon which are engaged between enlargements 71 of the shifting rod 24, so that as the shifting head 63 is moved, it correspondingly moves the shifting rods 24. It will be understood that the shifter members 66 rotate within a block 64 and that there is interengagement between the same at annular tongues and grooves 72.

The lever 28 may be locked in any of the different positions through any suitable locking or latching means at 73 controlled by the depression of a button 74 or equivalent means carried by the lever 28.

The casing 10 may be of any desired construction, preferably having its sides removably secured by means of bolts 75. Since the structure is substantially symmetrical from opposite sides, the interior of the transmission case is accessible from either side thereof for inspection or repair of the parts.

In the operation of the transmission, with shaft 12 driven by the engine, lateral movement of the lever 28 in one direction will rock the bar 54, causing valve 34 to cover port 33 and thus subject the piston 44 through the pipe 42 to pressure which slides rod 45, rocks lever 46 and disengages the clutch. While the lever 28 is at the same lateral angle, it is moved forwardly or rearwardly, operating the links and levers, to slide the shifting head 63, moving the shifter members 66 and sliding the rods 24 and moving the enlargements 25 between the clutch members 21 of the gears of the pair 15 and 18 desired for driving, whereupon lever 28 is moved laterally so that valve 34 uncovers port 33, releasing the pressure on the piston 44 and permitting the clutch to engage under its urging mechanism. It is clear that during the operation of the engine, the lever 28 may at any time be operated in order to shift the rods 24 and select any set of the variable speed gears 15 desired and in the case of reverse driving, to engage the gears 16 and 18.

Various changes may be resorted to provided they fall within the spirit and scope of the invention.

I claim as my invention:—

1. Apparatus of the class described comprising a hollow shaft, a rotatable member surrounding the shaft, rings surrounding the shaft and supporting the rotatable member with a portion of its bore wall in outwardly spaced relation to the periphery of the shaft, the engagement between the rotatable member and rings being along surfaces diverging with respect to the axis of rotation whereby in combination with the shaft a three-bearing floating motion is provided for the rotatable member, said shaft in line with said wall having a slot therethrough, a clutch member, a rod slidable in the bore of said shaft having portions of different diameter, said clutch member being in said slot and of greater dimension than the slot in a direction radially of the shaft, whereby the portion of the rod of greater diameter may contact the clutch member to project it partly beyond the periphery of the shaft to engage said bore wall of the rotatable member and such portion may be disaligned with the clutch member for release of the latter.

2. Apparatus of the class described comprising a hollow shaft, a rotatable member surrounding and slidable along the shaft, rings surrounding and slidable along the shaft and supporting the rotatable member with a portion of its bore wall in outwardly spaced relation to the periphery of the shaft, the engagement between the rotatable member and rings being along surfaces diverging with respect to the axis of rotation whereby in combination with the shaft a three-bearing floating motion is provided for the rotatable member, said shaft in line with said wall having a slot therethrough, a clutch member, a rod slidable in the bore of said shaft having portions of different diameter, said clutch member being in said slot and of a size whereby the portion of the rod of greater diameter may contact the clutch member to project it partly beyond the periphery of the shaft to engage said bore wall of the rotatable member and such portion may be disaligned with the clutch member for release of the latter, and means adjustable on the shaft to prevent slidable displacement of the rotatable member and rings.

3. Apparatus of the class described comprising a hollow shaft, a rotatable member surrounding the shaft, rings surrounding the shaft, said member and rings having oppositely inclined outwardly diverging surfaces in contact and supporting the rotatable member with a portion of its bore wall in outwardly spaced relation to the periphery of the shaft whereby in combination with the shaft a three-bearing floating motion is provided for the rotatable member, said shaft in line with said wall having a slot therethrough, a clutch member, a rod slidable in the bore of said shaft having portions of different diameter, said clutch member being in said slot and held against displacement therefrom and of greater dimension than the slot in a direction radially of the shaft, whereby the portion of the rod of greater diameter may contact the clutch member to project it partly beyond the periphery of the shaft to engage said bore wall of the rotatable member and such portion may be disaligned with the clutch member for release of the latter.

EDSON FITCH SPINNER.